United States Patent [19]

Nakagawa et al.

[11] Patent Number: 5,100,047

[45] Date of Patent: Mar. 31, 1992

[54] SPACING RING FOR TUBES IN HIGH TEMPERATURE ENVIRONMENT

[76] Inventors: Yukihiro Nakagawa, Aza Higashinokawa 19, Oaza Takadaji, Shikatsucho, Nishikasugaigun, Aichi-Prefecture, Japan; Alan L. Brittingham, 1531 13th St., Columbus, Ind. 47201

[21] Appl. No.: 644,515

[22] Filed: Jan. 23, 1991

Related U.S. Application Data

[62] Division of Ser. No. 444,535, Dec. 1, 1989, Pat. No. 5,056,832.

[51] Int. Cl.⁵ .................. F16J 15/12; B23K 31/02
[52] U.S. Cl. ..................... 228/176; 228/177; 228/182; 29/890.08; 277/166; 277/DIG. 6; 285/917
[58] Field of Search .................. 228/136, 138, 173.5, 228/167, 189; 29/890.08; 285/917; 277/DIG. 6, 166

[56] References Cited

U.S. PATENT DOCUMENTS

| | | | |
|---|---|---|---|
| 4,417,733 | 11/1983 | Usher | 277/DIG. 6 |
| 4,462,603 | 7/1984 | Usher et al. | 277/DIG. 6 |
| 4,463,959 | 8/1984 | Usher et al. | 277/230 |
| 4,559,248 | 12/1985 | Sumiyoshi et al. | 277/230 |
| 4,559,249 | 12/1985 | Arigaya et al. | 277/DIG. 6 |
| 4,659,091 | 4/1987 | Baasner et al. | 285/917 |
| 4,747,624 | 5/1988 | Faber et al. | 285/917 |
| 4,762,330 | 8/1988 | Lönne et al. | 285/917 |

Primary Examiner—Samuel M. Heinrich
Attorney, Agent, or Firm—Wood, Phillips, Mason, Recktenwald & VanSanten

[57] ABSTRACT

A spacing ring for placement between a radially inwardly facing annular surface on a first member and a radially outwardly facing annular surface on a second member to maintain the first and second members in predetermined radially spaced relationship. The ring consists of a plurality of matted metal threads formed into an annular configuration. The ring has a radially inwardly facing surface to surroundingly engage the radially outwardly facing annular surface on the second member and a radially outwardly facing surface to be surroundingly engaged by the inwardly facing annular surface of the first member with the radially inwardly facing annular surface on the first member and the radially outwardly facing annular surface on the second member in axially overlapping relationship. The invention also contemplates a method of forming the spacing ring. The wool material is wrapped around an annular surface on a core bar. The wool material is both radially and axially compacted on the core bar with a predetermined compressive force.

13 Claims, 2 Drawing Sheets

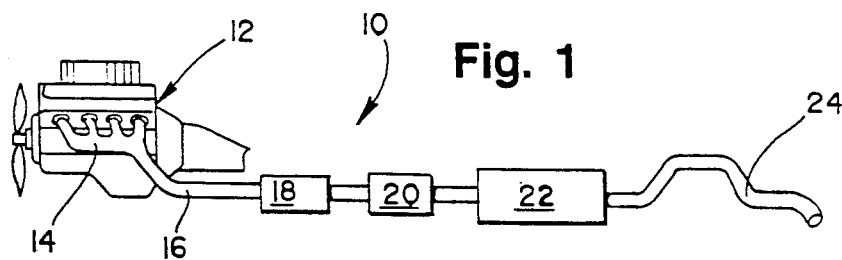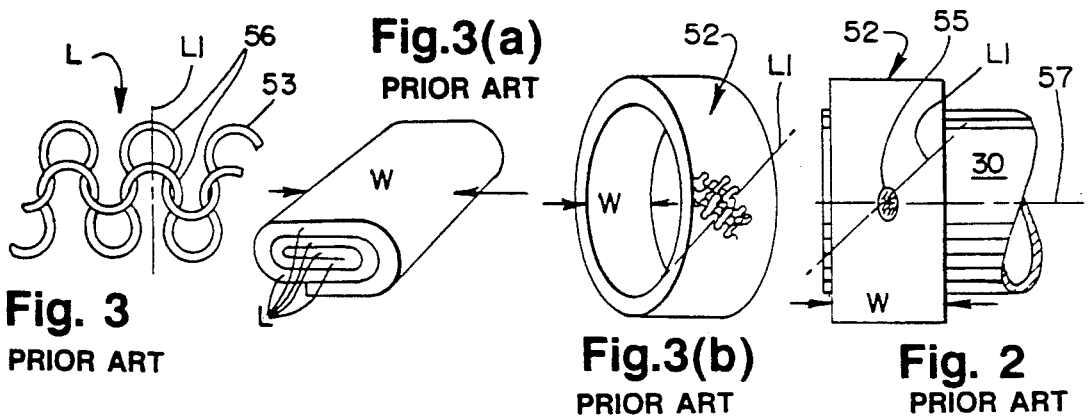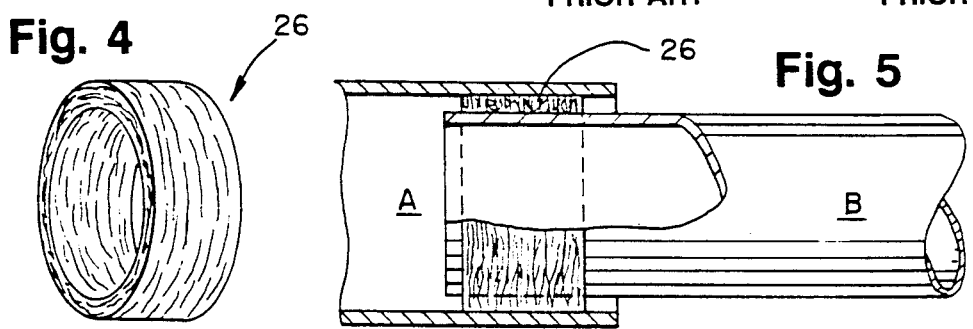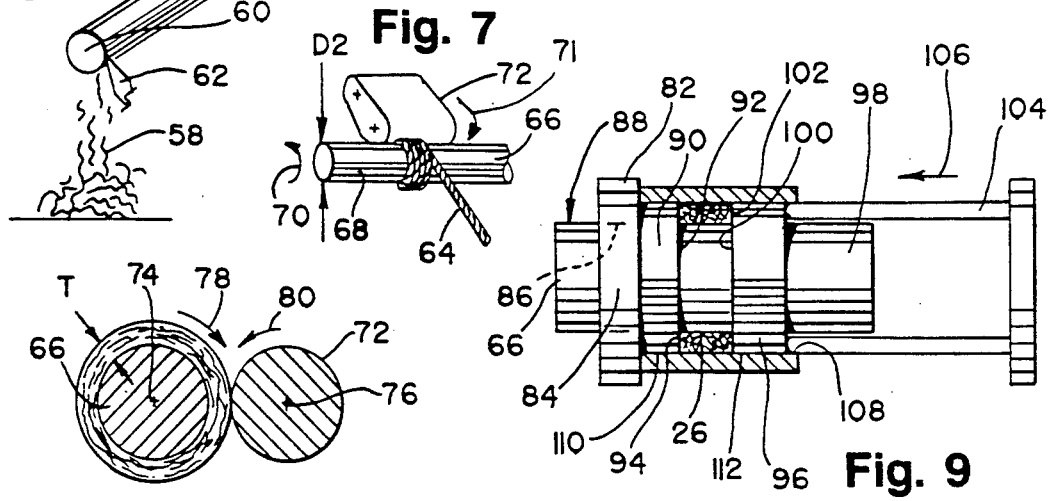

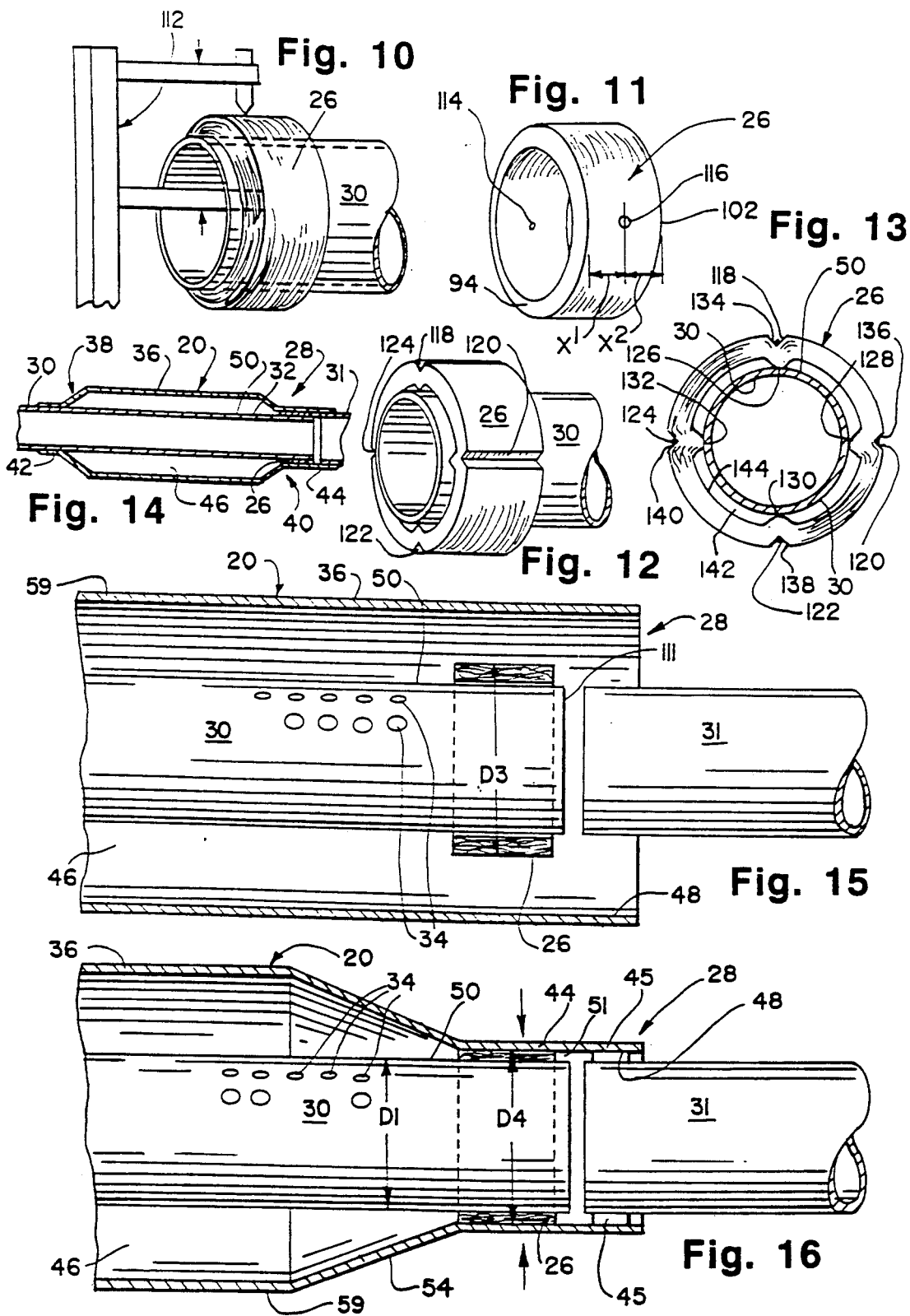

SPACING RING FOR TUBES IN HIGH TEMPERATURE ENVIRONMENT

CROSS REFERENCE

This is a divisional application of co-pending application Ser. No. 444,535 filed Dec. 1, 1989, now U.S. Pat. No. 5,056,832 entitled "Spacing Ring for Tubes in High Temperature Environment".

BACKGROUND OF THE INVENTION

1. Field of the Invention

This invention relates to spacer rings for placement between hard tubular elements that are interfit, one within the other, to facilitate relative shifting therebetween and, more particularly, to a ring formed from matted metal threads.

2. Background Art

There are many high temperature environments in which tubular metal elements/pipes are joined together by mating, one within the other. One exemplary environment is an automobile exhaust system wherein several of the exhaust components are so interconnected.

One problem that has plagued the automobile industry is that of noise generation between the mated tubular elements on the exhaust system. Differences in the heating and cooling rates for the cooperating elements can cause relative shifting and rubbing together of adjacent hard metal surfaces thereon, which can generate significant noise.

It is known to employ a spacer element to maintain a predetermined gap between the facing surfaces to accommodate expansion and contraction of the elements, without rubbing therebetween, through the contemplated operating temperature range. One conventional spacer consists of a ring of wire mesh interposed between the radially outwardly facing surface of the inner element and the radially inwardly facing surface of the outer element. This mesh material is made from a relatively heavy gauge, woven wire. The formed ring is bonded to the inner element, as by welding.

There are several drawbacks with the above wire mesh spacer ring. First, the wire defining the mesh is sufficiently rigid that the ring is virtually incompressible. Consequently, the ring lacks the flexibility necessary to accommodate dimensional variations in the elements resulting from temperature changes.

A further drawback with the wire mesh ring of the prior art is that the wire of the mesh is so rigid that it is virtually impossible to accurately conform the ring to the surfaces of the inner and outer elements between which it is interposed. The result is that certain points of the ring are rubbed against the inner surface of the outer tube and themselves produce an undesirable grating noise when the elements shift.

A further problem with the prior art mesh ring results from spot welding, which is the process generally used to affix the ring to the inner element. The spot welds deform the ring from its desired cylindrical configuration. The result is a reduction in the contact area between the ring and facing surfaces of the elements and considerable noise production when the elements shift.

Further, the wire mesh, because of its inability to conform to and fill the region between the tubes, leaves a gap for the transmission of sound waves. This problem is aggravated in the regions surrounding the welds.

Another attempted solution to the above problem has been the provision of a radially projecting dimple on one of the inner and outer elements. The dimple maintains a desired spacing between the inner and outer elements. However, the dimple, as with the wire mesh ring, rubs undesirably on the surface against which it bears and itself creates noise when the elements shift relative to each other.

SUMMARY OF THE INVENTION

The present invention is specifically directed to overcoming the above-enumerated problems in a novel and simple manner.

According to the invention, a spacing ring is provided for placement between a radially inwardly facing annular surface on a first member and a radially outwardly facing annular surface on a second member to maintain the radially facing surfaces on the first and second members in a predetermined spaced relationship. The ring consists of a plurality of matted metal threads formed into an annular configuration. The ring has a radially inwardly facing surface to surroundingly engage the radially outwardly facing annular surface on the second member and a radially outwardly facing surface to be surroundingly engaged by the inwardly facing annular surface on the first member, with the radially inwardly facing annular surface on the first member and the radially outwardly facing annular surface on the second member in axially overlapping relationship.

The inventive ring is sufficiently resilient that it will accommodate radial expansion and contraction of the first and second members. The ring readily conforms to the curvatures of both the radially inwardly and outwardly facing surfaces between which it is interposed and thereby effectively limits sound transmission through the space between the radially facing surfaces. The wool material is sufficiently soft that it will deform readily in shear and guide relative shifting between the first and second members without the generation of grating noises. At the same time, the ring is sufficiently rigid that it will substantially maintain its shape and thereby the spacing between the radially facing surfaces.

Preferably, the ring is formed from metal threads having a diameter in the range of 50–100 microns, and preferably 80 microns. The preferred material is stainless steel - SUS 434. Stainless steel maintains its integrity in high temperature environments, to which the ring is particularly suited.

Optimum ring performance, in terms of 1) maintaining the desired spacing between members; 2) conforming to the annular surfaces of the joined members; 3) deforming radially and in shear in response to expansion and contraction of the members; and 4) sliding against the surface of the outer member without noise generation, is realized by utilizing a compressive force, during formation, sufficient to produce a density for the ring threads of approximately 500 Kg/m$^3$.

In a preferred form, the ring is defined by a plurality of turns of a rope of the wool material. This facilitates wrapping of the material about a core.

The invention also contemplates a method of forming the spacing ring. According to the invention, the wool material is wrapped around an annular surface on a core bar. The wool material is both radially and axially compacted on the core bar with a predetermined compressive force.

The preferred method is carried out by wrapping a plurality of turns of the mesh rope onto the core bar. A compacting roller is urged against the metal wool material on the core bar with a predetermined force. The core bar and compacting roller are then rotated relative to each other so that a uniform compaction of the wool is effected about the perimeter of the core bar.

To effect axial compaction of the ring on the core bar, preferably three interacting mold parts are employed. The first part defines an axially facing blocking shoulder against which one axial end of the ring can be abutted. A second mold member has an annular shoulder which is urged biasably toward the blocking shoulder to thereby compress the ring between the first and second mold parts. The third part, a barrel, has an annular surface which surrounds the ring and controls radial deformation of the wool material as the ring is axially compressed by the first and second mold members.

The present invention further contemplates a method of establishing a spaced connection between a radially inwardly facing surface on a first member and an axially overlapping, radially outwardly facing surface on a second member.

According to the invention, the annular ring of wool material is placed in surrounding relationship with the outwardly facing surface on the second member. The first member is then positioned relative to the second member so that the radially inwardly facing surface on the first member surrounds the outwardly facing ring surface.

The ring member is fixed, preferably to the radially inwardly facing ring surface. This can be accomplished by a number of techniques, and preferably by a welding process. The weld may be a spot weld or a line weld. If the spot weld is employed, one or more welds are provided and located preferably midway between the axial ends of the ring.

If line welds are employed, at least first and second welding lines are provided at diametrically opposite portions of the ring and extend over the axial extent of the ring.

Once the ring is welded in place, the first member can be deformed radially inwardly to compressibly capture the ring between the radially facing surfaces on the first and second members. By deforming the first member as described, the ring deforms to substantially fill the space between the radially facing surfaces on the first and second members and any gap/recess in the ring that may be created by the welding process.

The inventive ring is particularly useful in high temperature environments, such as in an automobile exhaust system. However, it may be used in any system, whether high temperature or not, to maintain a desired spacing between interconnected tubular elements that are mated, one within the other.

BRIEF DESCRIPTION OF THE DRAWINGS

FIG. 1 is a schematic, side elevation view of a vehicle engine and associated exhaust system in which the present invention can be employed;

FIG. 2 is a side elevation view of a prior art woven wire mesh spacer ring in operative position on a tubular element/pipe;

FIGS. 3-3(b) show the successive steps in formation of the prior art spacer ring of FIG. 2;

FIG. 3 is an enlarged plan view of a section of a woven wire layer used to form the ring of FIG. 2;

FIG. 3(a) is a perspective view of a plurality of wrapped layers of the material in FIG. 3 used to form the ring of FIG. 2; and FIG. 3(b) is a perspective view of the prior art ring of FIG. 2 made by forming the wrapped layers of FIG. 3(a) into an annular shape;

FIG. 4 is a perspective view of a preferred form of spacing ring according to the present invention;

FIG. 5 is a side elevation view of an exemplary connection between first and second tubular members/pipes, with the inventive ring in FIG. 4 assembled therebetween;

FIGS. 6-9 show the successive steps in formation of the spacing ring according to the present invention:

FIG. 6 is a schematic representation of a shaving process for creating metal fibers to form the ring;

FIG. 7 is a perspective view of a core bar showing the step of winding and compacting the wool material, in rope form, around the core bar;

FIG. 8 is a side elevation view showing the step of radially compacting the wool material on the core bar; and FIG. 9 is a sectional, side elevation view of a compacting mold system and showing the step of axially compressing the wool material on the core bar;

FIG. 10 is a perspective view of a tubular member/pipe with the inventive ring thereon and being welded thereto;

FIG. 11 is a perspective view of the ring showing a preferred location of spot welds used to affix the ring to the tubular member/pipe;

FIG. 12 is a perspective view of the inventive ring on a tubular member/pipe with a plurality of line welds used to affix the ring to the tubular member/pipe;

FIG. 13 is an end elevation view of the ring and tubular member/pipe of FIG. 12;

FIG. 14 is a side, sectional view of interconnected exhaust system elements with the inventive spacing ring incorporated therein;

FIG. 15 is an enlarged, side elevation view of a part of a first and second of the exhaust system elements employing the inventive ring, during the assembly process; and FIG. 16 is a view as in FIG. 15 with one of the first and second elements compressed radially inwardly into assembled relationship with the other of the first and second members and thereby compressibly capturing the ring in its operative relationship with the other of the first and second members and thereby compressibly capturing the ring in its operative position.

DETAILED DESCRIPTION OF THE DRAWINGS

In FIG. 1, one exemplary environment for use of the present invention is depicted. The system at 10 is a vehicle exhaust system and consists of an engine 12, with an exhaust manifold 14, which communicates through a conduit 16 consecutively through a converter 18, a pre-muffler/resonator 20 and a muffler 22. Gases from the muffler 22 are exhausted through a tailpipe 24 away from the system 10.

The invention is concerned with the connection between cooperating male and female tubular elements/pipes and, more particularly, with a ring at 26 (FIG. 4) utilized to maintain a predetermined spacing between interfitting male and female elements, identified generically as A and B in FIG. 5. Spacing between the male and female elements A,B is required to accommodate expansion and contraction of the first and second elements A, B and prevent direct contact and rubbing between the elements A, B as might generate noise upon the elements A, B shifting relative to each other.

It should be understood that while the invention can be used with any male and female tube/pipe connection, and in any environment, it is particularly adaptable to the high temperature exhaust system environment of FIG. 1. The focus herein will be on an exemplary connection at one end 28 of the pre-muffler 20 (FIGS. 14-16).

The pre-muffler/resonator 20 consists of a front exhaust pipe 30 and a rear exhaust pipe 31. The rear portion 32 of the front exhaust pipe 30 is made porous as by the provision of a plurality of radially extending through bores 34. An outer, cylindrical housing 36 surrounds the rear pipe portion 32 and is deformed radially inwardly at its front and rear ends 38, 40, respectively, to define a reduced diameter collar 42 at its front end 38 and a reduced diameter collar 44 at its rear end 40. An annular silencer chamber 46 is defined between the rear pipe portion 32 and the housing 36.

The collar 42 is welded directly to the front exhaust pipe 30. The rear pipe 31 is fixed directly to the collar 44 as by welds 45 (FIG. 16). The ring 26 is interposed between the radially inwardly facing surface 48 on the rear collar 44 and the radially outwardly facing surface 50 on the rear pipe portion 32 so as to maintain a predetermined space 51 therebetween.

Heretofore, it has been common to employ a ring, such as that shown at 52 in FIGS. 2 and 3-3(b), to maintain the spacing between the collar 44 and exhaust pipe portion portion 32. The ring 52 is constructed by forming a plurality of layers of a woven wire mesh material into an annular shape. The wire defining the mesh is generally 0.13 to 0.15 millimeters in diameter, and is therefore quite rigid. Each layer, is formed by weaving the wire 53 in the manner shown in FIG. 3. The woven wire material is then wrapped about itself, as shown in FIG. 3(a), to produce a plurality of layers L— in this case six, with a desired width W for the ring 52. The preformed element in FIG. 3(a) is then formed into the annular shape of FIG. 3(b) to complete the ring 52. The ring 52 is placed around and affixed to the pipe portion 32 as by spot welding. One spot weld 55 is shown in FIG. 2, however four spot welds are commonly used. The layers L of the ring 52 are oriented so that the lines L1 (one shown) bisecting the generally horseshoe-shaped loops 56 defined by the weaving process, are oriented at approximately a 45# angle with respect to the longitudinal axis 57 of the pipe portion 32.

The difficulty with the prior art woven mesh ring 52 is that it is sufficiently rigid that it is not only difficult to make, but it does not accurately conform to the annular surfaces 50 (one shown) between which it resides and affords little cushion between the exhaust pipe portion 32 and collar 44. The wire, which is commonly stainless steel, produces a grating noise as it rubs against the inside surface 48 of the collar 44. Still further, the spot welds 55 create air gaps and further deform the ring 52 from its preferred annular shape. The present invention overcomes these drawbacks.

According to the present invention, the ring 26 is formed from matted metal threads/wires. Preferably the threads have a diameter in the range of 50-100 microns, with a preferred diameter of 80 microns. Preferably, the thread material is stainless steel - SUS 434.

According to the invention, the wool material is compacted under a predetermined pressure to produce the annular configuration of FIG. 4. The compaction pressure is sufficient to produce a density for the ring threads of approximately 500 Kg/m$^3$, but may be varied depending upon the particular demands of the environment and the particular application for the ring 26. This pressure compacts the threads sufficiently that the ring 26 will maintain its shape. At the same time, the ring remains resilient enough to conform to the surfaces between which it is captured, and flex in response to relative movement between the collar 44 and exhaust pipe portion 32. The outer surface of the ring 26 is soft, because of the woolly nature of the material from which it is made, and slides silently against the collar 44. Further, the ring 26 deforms readily in shear upon the collar 44 and pipe 32 moving relative to each other.

Once the ring 26 is formed, it is placed in surrounding relationship with the rear exhaust pipe portion 32, as seen in FIGS. 12, 14 and 15 and affixed thereto, preferably by welding. The pre-muffler housing 36 is then deformed from the FIG. 15 configuration radially inwardly, as by a swaging process, to define the collar 44 and a tapering neck 54 connecting between the constant diameter body 59 of the housing 36 and the collar 44, to complete the pre-muffler subassembly 20, as shown in FIG. 16.

PROCESS FOR FORMING THE RING 26

The individual wires/threads 58 making up the ring 26 can be formed by shaving a piece of stainless steel stock 60, as shown in FIG. 6. A conventional shaving tool 62 engages the stock 60 and causes the individual wires/threads 58 to be separated therefrom as the stock 60 is translated relative to the tool 62 in the direction of arrow 64. A multitude of wires 58 is then accumulated into a manageable rope 64, as shown in FIG. 7. The rope 64 is wrapped around a cylindrical core bar 66 having a diameter D2 (FIG. 7) that is slightly larger than the diameter D1 (FIG. 16) of the outer surface 50 of the exhaust pipe portion 32. Exemplary dimensions are as follows:

D1 (for the exhaust pipe portion 32—FIG. 16)=50.8 mm.
D2 (for the core bar 66—FIG. 7)=52 mm.
D3 (for the ring 26—FIG. 15)=56 mm.

These dimensions should not be viewed as limiting and are given only by way of example.

The rope 64 is wrapped against the outer surface 68 of the core bar 66, preferably by rotating the core bar 66 about its length, as indicated by arrow 70 in FIG. 7. As the rope 64 is being wrapped on the core bar 66, a compacting roller 72, as shown in FIG. 8, is pressed against the wool on the bar 66 and oppositely rotated in the direction of arrow 71 to radially compact the wool material against the core bar 66. The core bar 66 and compacting roller 72 are rotatable about spaced, parallel axes 74, 76, respectively. The compacting roller 72 is urged against the wool material with a predetermined force. Relative rotation of the core bar 66 and compacting roller 72 in the direction of arrows 78, 80 (FIG. 8) then effects an even compaction of the wool around the periphery of the core bar 66 to a desired thickness T.

Once the wool material is compacted suitably in a radial direction, axial compaction of the ring 26 is effected, and preferably through a mold system such as that shown in FIG. 9. A first mold part 82 having a stepped body 84 and a bore 86 therethrough is slid over the end 88 of the core bar 66.

The one portion 90 of the mold part 82 defines an annular blocking shoulder 92, which abuts one end 94 of the ring 26 on the core bar 66. A second mold part 96, having an annular configuration, is slid over the opposite end 98 of the core bar 66 and has an annular shoulder 100 which can be borne against the opposite ring end 102.

With the mold part 82 held fixed on the core bar 66, the mold part 96 can be urged towards the mold part 82 to compress the ring 26 in an axial direction. Movement of the mold part 96 towards the mold part 82 can be effected through a plunger 104 biased in the direction of arrow 106.

To prevent radial bulging of the ring 26 and guide translation of the mold part 96, a sleeve-like barrel 108 is provided and surrounds the outer surfaces 110, 112 of the mold parts 82, 96.

Once the ring 26 is formed to the desired shape, the mold parts 82, 96 are slid to the left in FIG. 9 relative to the barrel 108 and core bar 66. The ring 26 is thereby released.

ATTACHMENT OF THE RING 26

Once the ring 26 is formed, it is placed over the exhaust pipe portion 32 in a position spaced slightly from the rear edge 111 (FIG. 15) of the pipe portion 32. Placement of the ring 26 is facilitated by having the inside diameter D2 thereof slightly larger than the outside diameter D1 of the pipe portion 32. Through a conventional welding mechanism at 112 (FIG. 10), spot welds 114, 116 are formed, as shown in FIG. 11, or alternatively, axial weld beads/lines 118, 120, 122, 124 are formed to effect connection of the ring 26 to the outer surface 50 of the pipe portion 32.

If spot welding is performed, preferably three or four such welds 114, 116 (two shown) are located axially at the midportion of the ring 26. As can be seen in FIG. 11, the weld 116 is located so that the distances X1 and X2 from the one ring end 94 and the other ring end 102, respectively, are equal.

If lines of welding, as in FIGS. 12 and 13 are formed, preferably the lines 118, 120, 122, 124 are equidistantly spaced around the periphery of the ring 26 and pipe portion 32. As can be seen in FIG. 13, the welds 118, 120, 122, 124 cause the ring 26 to be deformed radially inwardly so as to define inwardly projecting, elongate ribs 126, 128, 130, 132 which contact the outer surface 50 of the pipe portion 32. The result is that there are slight indentations 134, 136, 138, 140 around the outer periphery of the ring 26 and an annular space 142 between the radially inwardly facing surface 144 of the ring 26 and the radially outwardly facing surface 50 of the exhaust pipe portion 32.

The housing 36 is then placed in the FIG. 15 position relative to the pipe portion 32, and deformed by a swaging operation to the FIG. 16 configuration. As the inside surface 48 of the housing 36 is deformed, it compresses the ring 26 from the FIG. 15 position to a slightly reduced diameter D4, preferably on the order of 54.8 mm. As this occurs, the wool material collapses into the indents 134, 136, 138, 140 and collapses into and fills the space 142. If spot welding is employed, the compression of the ring 26 by the collar 44 will fill any voids/dimples created by the spot welds 114, 116 and fill the corresponding space 142.

The ring 26 maintains sufficient resilience that it allows for relative movement between the housing 36 and pipe portion 32. The wool material, even though made of stainless steel, has a soft surface that will not grate against the pipe portion 32 and produce undesirable noise. At the same time, the ring 26 is sufficiently rigid that the desired spacing between the housing 36 and pipe portion 32 is maintained. The steel material is resistant to the high temperatures contemplated in the vehicle exhaust system environment.

The invention contemplates the use of the ring 26 not only in the automobile environment, but in any environment wherein there are cooperating, cylindrical first and second members, such as those A, B in FIG. 5, which are assembled, one within the other.

The foregoing disclosure of specific embodiments is intended to be illustrative of the broad concepts comprehended by the invention.

We claim:

1. A method for establishing spaced connection between a radially inwardly facing surface on a first member and an axially overlapping radially outwardly facing surface on a second member, said method comprising the step of:

forming an annular ring from a wool material consisting of matted metal threads, said ring having a radially inwardly facing surface and a radially outwardly facing surface;

placing the ring on the second member so that the radially inwardly facing ring surface surrounds the outwardly facing surface on the second member; and positioning the first member relative to the second member so that the radially inwardly facing surface on the first member surrounds the outwardly facing ring surface and the ring maintains the first and second members in nonengaging, radially spaced relationship in the vicinity of the ring.

2. The method of establishing spaced connection between radially inwardly and outwardly facing surfaces on first and second members according to claim 1 including the step of fixing the radially inwardly facing ring surface to the radially outwardly facing surface on the second member before positioning the first member relative to the second member.

3. The method of establishing a connection between radially inwardly and outwardly facing surfaces on first and second members according to claim 2 wherein the fixing step comprises the step of welding the radially inwardly facing ring surface to the radially outwardly facing surface on the second member.

4. The method of establishing a connection between radially inwardly and outwardly facing surfaces on first and second members according to claim 3 including the step of spot welding the ring to the outwardly facing surface on the second member.

5. The method of establishing a connection between radially inwardly and outwardly facing surfaces on first and second members according to claim 3 including the step of providing first and second weld lines on diametrically opposite portions of the ring to fix the ring to the outwardly facing surface on the second member.

6. The method of establishing a connection between radially inwardly and outwardly facing surfaces on first and second members according to claim 1 wherein the first and second members are parts of a vehicle exhaust system.

7. The method of establishing a connection between radially inwardly and outwardly facing surfaces on first and second members according to claim 1 wherein the metal threads are formed from stainless steel.

8. The method of establishing a connection between radially inwardly and outwardly facing surfaces on first and second members according to claim 1 wherein the metal threads are formed from SUS 434.

9. The method of establishing a connection between radially inwardly and outwardly facing surfaces on first and second members according to claim 1 wherein the metal threads have a diameter in the range of 50–100 microns.

10. The method of establishing a connection between radially inwardly and outwardly facing surfaces on first and second members according to claim 1 including the step of compacting the wool material under a predetermined pressure to form said ring.

11. The method of establishing a connection between radially inwardly and outwardly facing surfaces on first and second members according to claim 10 wherein the wool is compacted under a pressure sufficient to produce a density for the ring threads of approximately 500 Kg/m$^3$.

12. A method for establishing spaced connection between a radially inwardly facing surface on a first member and an axially overlapping radially outwardly facing surface on a second member, said method comprising the step of:
    forming an annular ring from a wool material consisting of matted metal threads,
    said ring having a radially inwardly facing surface and a radially outwardly facing surface;
    placing the ring on the second member so that the radially inwardly facing ring surface surrounds the outwardly facing surface on the second member;
    positioning the first member relative to the second member so that the radially inwardly facing surface on the first member surrounds the outwardly facing ring surface; and
    deforming the first member radially inwardly to compressively capture the ring between the radially facing surfaces on the first and second members.

13. A method for establishing spaced connection between a radially inwardly facing surface on a first member and an axially overlapping radially outwardly facing surface on a second member, said method comprising the step of:
    forming an annular ring from a wool material consisting of matted metal threads,
    said ring having a radially inwardly facing surface and a radially outwardly facing surface;
    placing the ring on the second member so that the radially inwardly facing ring surface surrounds the outwardly facing surface on the second member;
    positioning the first member relative to the second member so that the radially inwardly facing surface on the first member surrounds the outwardly facing ring surface; and
    forming wool material into a rope and wrapping said rope in a plurality of turns to define said ring.

* * * * *